United States Patent [19]

Horváth et al.

[11] 4,091,566

[45] May 30, 1978

[54] EQUIPMENT FOR THE INVESTIGATION OR OPTIMIZATION OF THE PROPERTIES AND RAISING METHODS OF ORGANISMS

[75] Inventors: István Horváth, Esztergom; Sándor Köröspataky, Budapest; Sándor Rajki, Martonvasar; András Tejfalussy, Budapest; Tibor Tischner, Martonvasar, all of Hungary

[73] Assignee: Magyar Tudomanyos Akademia Mezogazdasagi Kutato Intezete, Martonvasar, Hungary

[21] Appl. No.: 720,206

[22] Filed: Sep. 3, 1976

[30] Foreign Application Priority Data

Sep. 5, 1975 Hungary .......................... MA 2716

[51] Int. Cl.² ............................................. A01G 9/02
[52] U.S. Cl. .................................. 47/17; 47/DIG. 6; 47/58
[58] Field of Search ................... 47/17, 59, 1, 18, 58, 47/DIG. 6

[56] References Cited

U.S. PATENT DOCUMENTS

| | | | |
|---|---|---|---|
| 1,827,530 | 10/1931 | Le Grand | 47/17 X |
| 2,015,924 | 10/1935 | De Lhorbe | 47/18 |
| 3,124,903 | 3/1964 | Truhan | 47/17 |
| 3,424,231 | 1/1969 | Truhan | 47/17 X |
| 3,481,073 | 12/1969 | Yoshida et al. | 47/17 |
| 3,613,308 | 10/1971 | Klein et al. | 47/17 |
| 3,869,826 | 3/1975 | Fischer | 47/17 |
| 3,870,873 | 3/1975 | Mallory | 47/17 X |
| 3,905,153 | 9/1975 | Enter | 47/17 X |
| 3,956,852 | 5/1976 | Ceausescu | 47/17 |

FOREIGN PATENT DOCUMENTS

| | | |
|---|---|---|
| 22,524 | 10/1956 | Germany. |
| 2,206,275 | 8/1973 | Germany. |
| 66,509 | 10/1950 | Netherlands. |

Primary Examiner—Robert E. Bagwill
Attorney, Agent, or Firm—Young & Thompson

[57] ABSTRACT

The invention relates to equipment for the investigation or optimization of the properties and/or raising methods of organisms, having a growth or breeding surface and/or space for the treatment and/or investigation of the organisms, and, if desired, sensory units for recording the values of environmental factors affecting the organisms and/or the properties of the organisms. According to the invention, the equipment has one or more treating and/or controlling units creating continuous or varying regular distributions acting in diverse directions with respect to at least two environmental factors.

With the help of the equipment according to the invention, the properties of organisms and the effects and interactions of the conditions under which they are raised can be elucidated and optimized in a simple manner, using a minimum number of experimental individua, a minimum amount of material and an extremely short experimental period.

10 Claims, 8 Drawing Figures

EQUIPMENT FOR THE INVESTIGATION OR OPTIMIZATION OF THE PROPERTIES AND RAISING METHODS OF ORGANISMS

This invention relates to an equipment for the investigation or optimization of the properties and raising methods of organisms.

It is known that all organisms have the characteristic property of being in a continual interaction with the external environment which interaction is realized through the metabolism. It is also known that none of the environmental factors affects the organisms in an isolated way but only in interaction with the other factors. In the raising equipment used in practice for the analysis of the interactions between organisms and the external environment and, on the basis of this analysis, for the investigation or optimization of the properties or organisms and of methods for raising them, one or more discrete combinations of those abiotic environmental factors (such as air, light, heat, water, mineral substances) and biotic environmental factors (such as other organisms) which are in continual interaction with organisms possessing known initial properties, can be adjusted for given periods as a homogeneous environment.

It is also known that biological processes are continuous in time and thus the duration of experiments connected with these processes is limited. By means of all the known types of equipment, simultaneously or consecutively, only homogeneous conditions can be secured, or rather only combinations of these homogeneous conditions can be created with respect to a number of environmental factors of practical importance. Consequently, the efficiency and economy of research carried out by means of these types of equipment, perticularly in the initial period which determines the direction of the research are extremely low. Thus, at the present rate of development, optimization by means of such equipment would be too costly and would require an inadmissible length of time.

The invention is aimed at providing equipment suitable for the investigation or optimization of organisms, and of methods for raising them, by means of which equipment the properties of the organisms and the effects or interactions of the conditions under which they are raised can be elucidated or optimized, if desired, in a convergent manner, simply, with the use of a minimum number of experimental individua and material and within an extremely short experimental period.

The invention is based on the recognition that the above aim can be attained by means of equipment possessing treating and controlling units which create continuous or varying regular distributions acting simultaneously or consecutively, in diverse directions with respect to at least two environmental factors.

Thus the invention relates to equipment for the investigation or optimization of the properties and the raising methods or organisms, the said equipment having a growth or breeding surface and/or space for the treatment and investigation of the organisms and, if desired, sensory units for recording the values of environmental factors affecting the organisms and the properties of same. The equipment according to the invention is characterized by one or more treating and/or controlling units creating continuous or varying regular distributions acting simultaneously or consecutively in diverse directions with respect to at least two environmental factors.

A preferred embodiment of the equipment according to the invention has a unit determining the spatial arrangement of the organisms treated and/or investigated in the growth or breeding space and, if desired, one or more sensory units recording the distribution of the values of environmental factors acting on the organisms or the distribution of the properties of the organisms and, if desired, a unit for transferring the investigated organisms to a desired point of the growth or breeding space.

One advantageous embodiment of the equipment according to the invention has one or more treating and/or controlling units for governing the distribution or parameters by rearrangement and/or by switching-over in any desired direction.

A further advantageous embodiment possesses one or more treating and/or controlling units which can be operated by rearrangement and/or switching-over in any optional grouping or order.

The sensory units of the equipment according to the invention can be directed or conducted to any desired point of the growth or breeding surface and/or space, and can also govern the treating and/or controlling unit.

Another advantageous embodiment of the equipment according to the invention possesses a programmable transferring unit and also has one or more treating and/or controlling units for at least one of the functions cooling-heating, humidifying and gas-feeding and one or more treating and/or controlling units carrying out by means of counter-current mixing the desired distribution of temperature, humidity and gas-content and forming a structural unit with the growth surface.

The equipment according to the invention can be applied more favourably than the conventional types of equipment to most tasks concerning the investigation and optimization or organisms. This is made generally possible by the fact that in the series of experiments carried out by the equipment according to the invention the effect of specific deviations (fundamentally characteristic of organisms) in the experimental individua arranged with a directed regular distribution is averaged out. It can easily be seen for example that on decreasing the investigated range step by step on the basis of experience gained in previous experiments in such a way that the absolute value of the directed changes characterizing the distributions tends to zero, we shall obtain the biological characteristics pertaining to a given combination of arbitrary environmental factors in the new experiment as the mean value of an increased number of individua in comparison to that in the former experiment. Thus the averaging accuracy of the conventional (uniform) methods can be exceeded with a simultaneous rise in the efficiency of the treatment. In comparison to conventional methods, on using the equipment according to the invention the efficiency will increase to $a.b.c./g$ where $a$, $b$ and $c$ denote the total number of combinations of the individual environmental factors $a$, $b$ and $c$ produced in both cases, whereas $g$ is the number of steps required to attain the desired accuracy.

The main advantages of the equipment according to the invention can be summarized as follows. a. For the first time it is possible to determine in a single experimental space, by means of a continuous method ensuring high relative accuracy, not only all the combinations of several environmental factors within a given range of values acting collectively on organisms raised simultaneously in the experimental space but also the range of adequate combinations, the knowledge of which is extremely advantageous in the practical application of the experimental results. b. The range of values of the environmental conditions acting on the organisms can be optionally extended or limited, thus assuring any optional degree of accuracy in the experimental results. c. The advantages specified in paragraphs (a) and (b) can be assured even when only a minimum number of experimental individua are raised; not only is very little material consumed in the experiments but the experimental period is also extremely short (this latter factor may be of decisive importance e.g. in experiments concerning the protection of the environment). d. The equipment is suitable for the optimization of the properties and growth conditions of very diverse organisms, and can thus be manufactured on a favourably large scale for diverse purposes. e. It may result in many cases in a significant saving in the cost of design and investment due to the fact that the equipment can be developed by means of simple structural modifications also from conventional constructions which serve for the raising of organisms and which can be considered in the light of the present invention as being obsolete for the purposes of optimization. f. The handling of the data concerning the organisms raised in the equipment according to the invention and the processing of these data by computers are also extremely simple because the data depend unambiguously on the site occupied by the organisms in the growth equipment.

A number of advantageous embodiments of the equipment according to the invention are presented below by means of FIGS. 1 to 8 in Examples 1 to 6.

The operation of the equipment presented in the Examples is discussed in connection with plant individua, but the equipment can also be used in an analogous manner in solving problems connected with other organisms.

The equipment according to the invention and its operation are illustrated in detail with reference to the Figures in the following non-limiting Examples.

EXAMPLE 1

Figure 1:
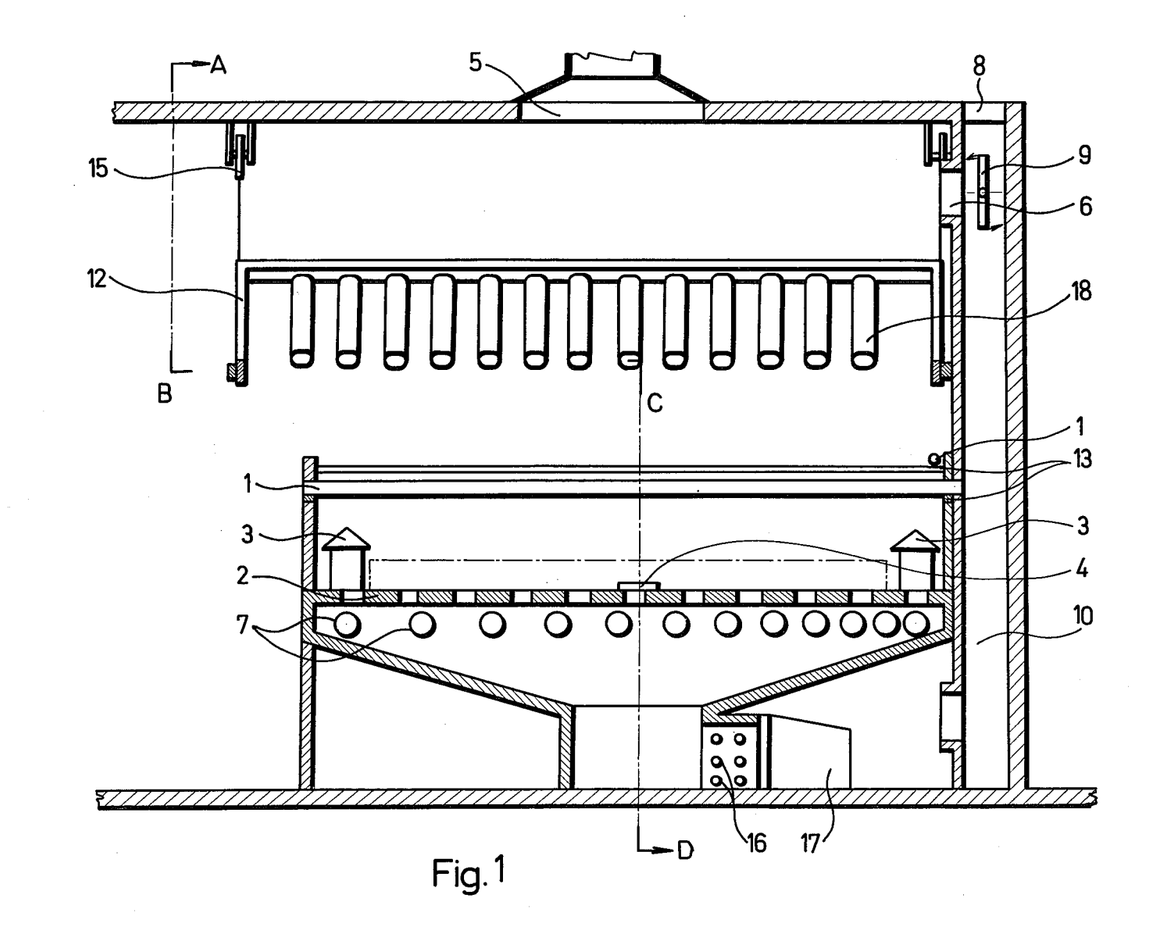
FIG. 1 is a side-view section of an advantageous embodiment of the equipment according to the invention.
Figure 2:
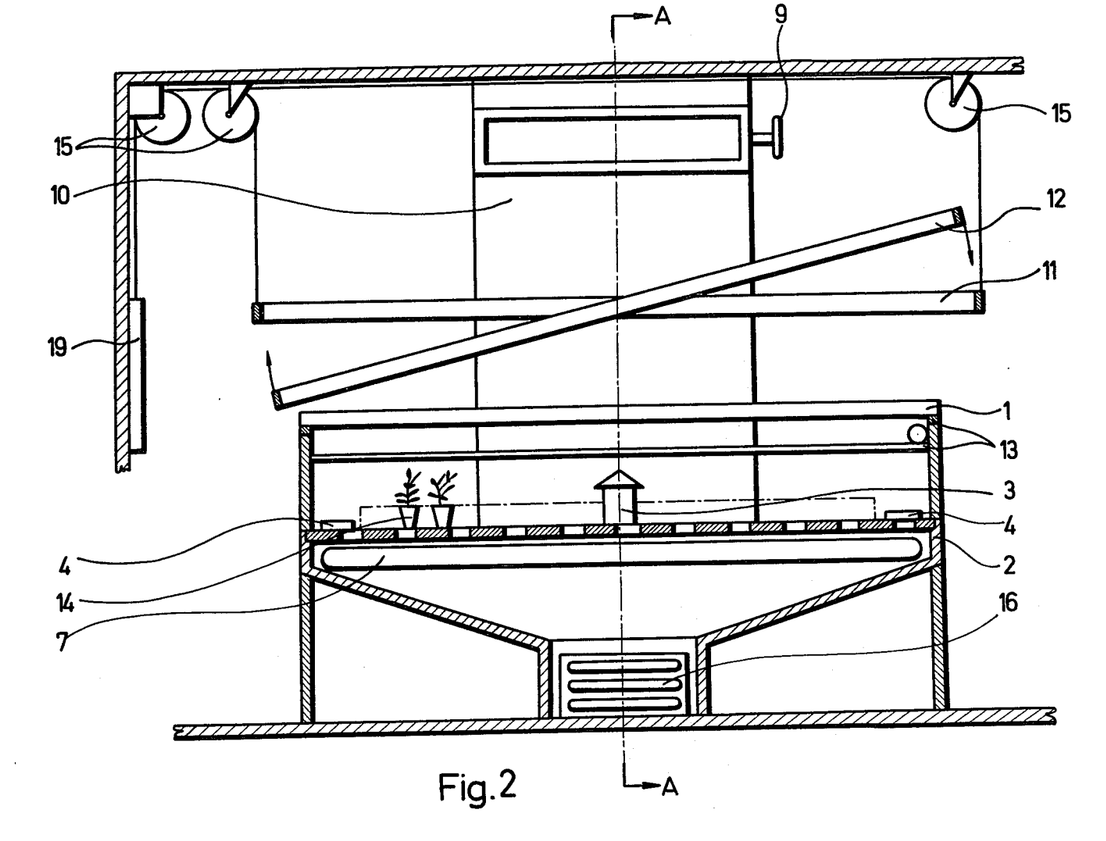
FIG. 2 is a section of FIG. 1 along the line ABCD.

In this Example an embodiment of the equipment according to the invention suitable mainly for the optimization of the properties of plants and methods of raising them is presented with reference to FIGS. 1 and 2.

The experimental plants 14 are placed on growth surface 2. The maximum and minimum values (limit values) of the air temperature gradient can be adjusted by means of a programming unit not shown in the Figures. Air is sucked in by the covered pipes 3 to the sensors of a regulating system not shown in the Figures, which sensors are, for the embodiment presented in this Example, also the sensors for the maximum and minimum values of air temperature. Fresh air is sucked in through aperture 8, next to which the regulating arm 9 for adjusting the ratio of fresh air to circulated air is located. The air enters fan 17 through pipe 10. The fan 17 forwards the sucked-in air into the growth space through the primary uniformly arranged cooling evaporator 16, then through the secondary (non-uniformly arranged) cooling evaporator 7 and through the specially designed growth surface 2, located above evaporator 7 and equipped with holes opening into the growth space. Air of adjusted temperature distribution entering the growth space flows vertically upwards over the growth surface 2. Part of this air is sucked off through aperture 5 whereas the remainder of the air passes through aperture 6 and is mixed with fresh air sucked in through aperture 8 and is then recycled through pipe 10 and through cooling evaporator 16 into the growth space. Neither the sensors of the regulating system and of any possible recording instruments, nor the programming units, nor the compressors and other refrigeration appliances of the cooling systems are shown in the Figures.

The adjustment of the absolute value of light intensity at the growth surface 2 is carried out by means of frame 11 movable in a vertical direction. The adjustment is facilitated by counterbalance 19 connected with the frame through pulleys 15. Minimum and maximum values of the light intensity at the growth surface 2, i.e., the value of the gradient, can be adjusted by varying the angle made by the light canopy 12 with the horizontal. Light source 18 of any optional spectrum can be located in the light canopy 12 as required by the aim of the experiment (e.g. so that the light is enriched in red rays in a given direction). Sensors measuring the exposure can be placed at points 4.

The pipes 1 which can be moved along the conducting rails 13 at an adjustable acceleration and/or with a continuously varying spraying surface serve for the irrigation (with water, nutrient solutions, etc.) and/or spraying and/or filling with various soil varieties and/or treating with fertilizers of any defined area of the growth space.

The growth equipment according to the Example is operated as follows. In case of the adjustment to be specified here, temperature and illumination gradients are adjusted in a direction perpendicular to one another.

The plants 14 serving as experimental individua are placed on the growth surface 2 in an arrangement determined by the experiment. The minimum and maximum values of temperature, and the length of night and day are adjusted in the programming unit. The light canopy 12 is placed in a horizontal position, then the mean value of illumination is adjusted by moving the frame 11 in a vertical direction. Subsequently, the light canopy 12 is deflected from the horizontal to such an extent that the desired minimum and maximum values of illumination are obtained at the appropriate edges of the growth surface 2. The exposure periods, i.e., the times of switching on and off of the individual illumination units, are adjusted in the programming unit. This completes the preparation (adjustment) of the growth equipment for the experiment; thereafter the adjusted values are maintained or readjusted automatically by the regulating units of the equipment.

Regulation is carried out in such a way that the fresh air sucked in through aperture 8 and the circulating air recycled through aperture 6 pass through pipe 10 and fan 17 to the primary cooling evaporator 16 where the air mixture is cooled or heated to the adjusted maximum temperature (continuous regulation of cooling and heating), depending on whether the temperature of the air passing through the pipe 3 to the regulating sensor monitoring the maximum temperature is higher or lower than the preadjusted maximum value. Air cooled or heated to the maximum temperature then enters the secondary (non-uniformly arranged) cooling evaporator where it is subjected to post-cooling. This post-cooling is carried out progressively to an extent varying parallel with the line connecting the pipes 3 leading to the regulating sensor monitoring the maximum and minimum values, and in such a way that at one end of the cooling evaporator the adjusted maximum value is obtained (no post-cooling occurs here) and at the other end the adjusted minimum value is maintained (here the post-cooling is the most intensive).

It can be seen clearly in FIGS. 1 and 2 that the maximum value of illumination will be obtained at the edge of the growth surface 2 which is nearest to the light canopy 12 whereas the minimum value will occur at the edge farthest from this frame. Between the two edges of the growth surface the illumination value plotted against the site will show a continuous and regular distribution function, the minimum being equal to the adjusted minimum value and the maximum to the adjusted maximum value.

By adjusting the equipment in the manner specified above, combinations of temperature and illumination can be found at which a given property of a given plant variety (e.g. tillering of wheat) will be optimal. In a practically realized form of the equipment 300 plant individua can be located each being in a different condition with respect to the temperature and illumination microclimate. This means that 300 pieces of a conventional phytotron equipment would be needed in this experiment for the investigation of the effect of the same temperature and illumination combinations.

EXAMPLE 2

Figure 3:
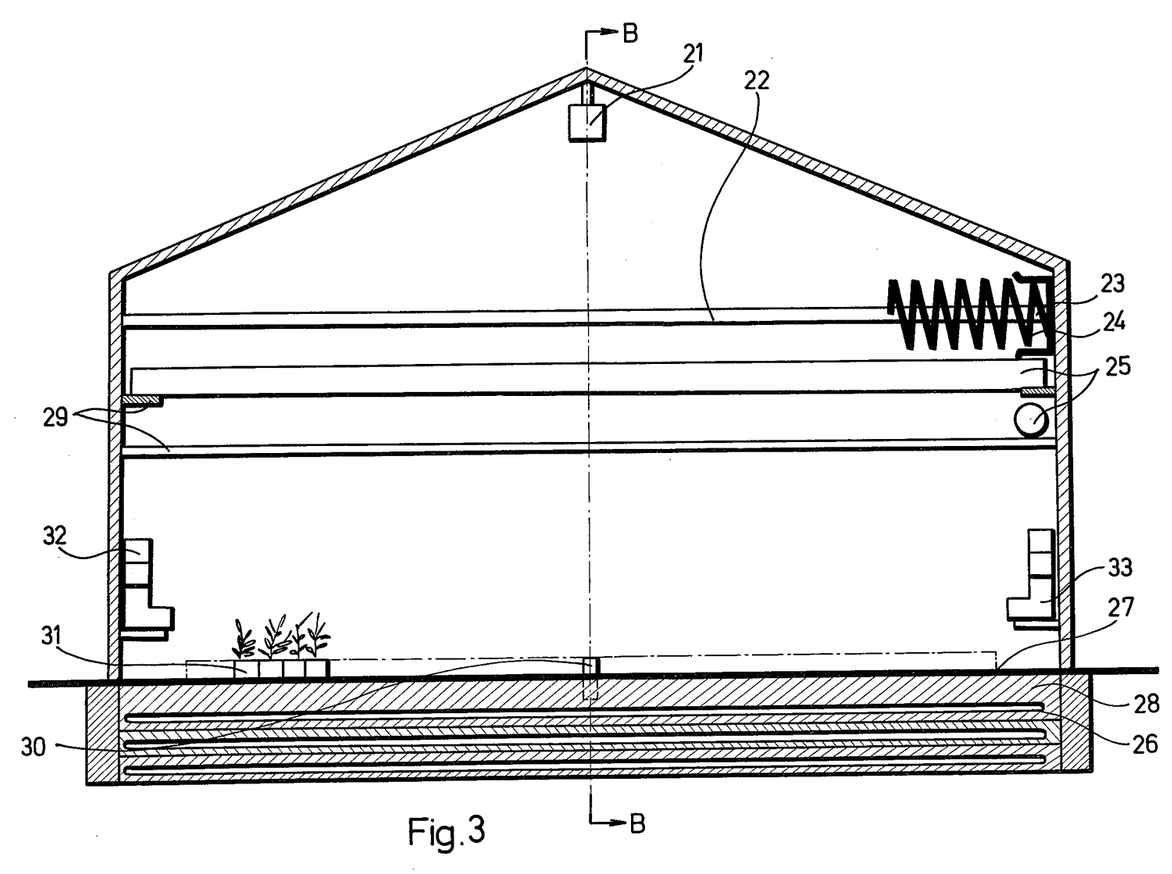
FIG. 3 is a front-view section of another advantageous embodiment of the equipment according to the invention.
Figure 4:
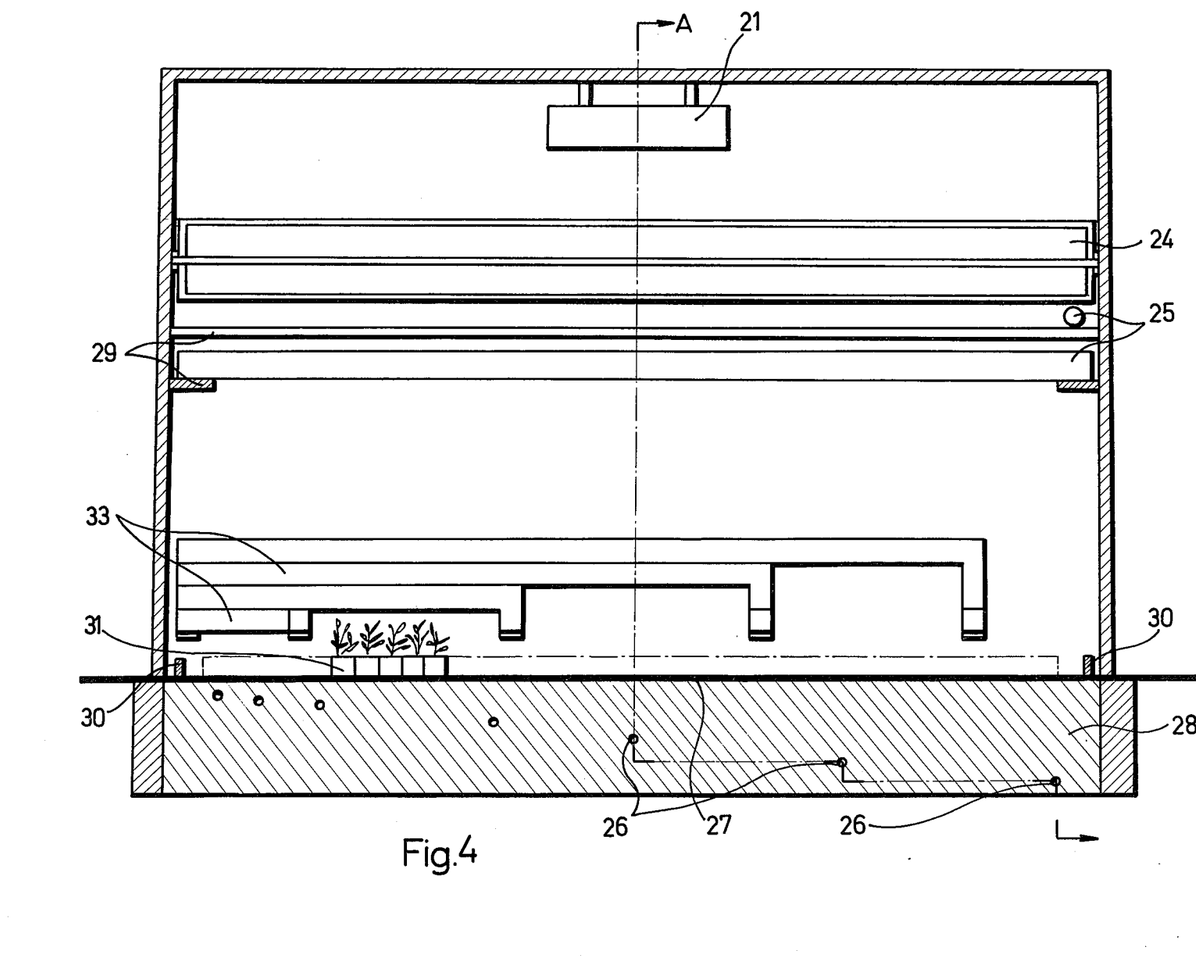
FIG. 4 is a section of FIG. 3 along the line B—B.

In this Example an embodiment (greenhouse) of the equipment according to the invention suitable for the optimization of raising methods for plants will be presented with reference to FIGS. 3 and 4.

The experimental plants 31 are placed on the growth surface 27 in a determined or at any optional time determinable arrangement. The maximum and minimum values of the soil temperature gradient can be adjusted by a programming unit not shown in the Figures. The sensors 30 of the regulating system also act as the sensors for the maximum and minimum values of soil temperature.

For the investigation of the photoperiodic effect on the growth surface 27 the shadowing screen 24 can be pulled along at an adjustable moment and at an adjustable velocity on the conducting rails 22 between the light source 21 supplying light for night illumination and the experimental plants 31.

The pipes 25 which can be moved along the conducting rails 29 at an adjustable acceleration and/or which have continuously varying spraying surfaces serve for the irrigation (with water, nutrient solution, etc.) and/or for spraying and/or for treating with fertilizers and/or for infecting (in resistance tests) and/or for contaminating (in investigations on the protection of the environment) of a definite area of the growth space.

Air with programmable differences in temperature and/or humidity and/or carbon dioxide content can be blown in through pipes 32 and then sucked off through pipes 33. The programming and climatizing units are not shown in the Figures.

The greenhouse according to this Example is operated as follows. In the case of the adjustment specified here the gradients of soil temperature and illumination period are adjusted in directions perpendicular to one another.

The plants 31 serving as experimental individua are placed on the growth surface 27 in an arrangement determined by the nature of the experiment. The minimum and maximum soil temperatures, together with the starting point of the night illumination, and the minimum and maximum periods of this illumination, i.e., the velocity at which the shadowing screen is pulled along, are adjusted in the programming unit. This completes the preparation (adjustment) of the greenhouse for the experiment; thereafter the adjusted values are automatically maintained by the regulating units of the equipment.

Regulation is carried out as follows. The current of the heating cables 26 placed in an a non-uniform arrangement in the soil 28 is altered by a thyristor-based regulating system in a direction and to an extent required to assure the programmed soil temperature gradient.

The time at which the light source 21 is switched on can be adjusted by means of a switching clock. The time when darkening (screening) begins and accordingly the minimum illumination period can also be adjusted by means of a switching clock which starts a servomotor which pulls along the shadowing screen 24 between light source 21 and the experimental plants 31 at an adjustable velocity. It can be clearly seen in FIG. 3 that the experimental plants 31 receive the minimum illumination period at the edge of the growth surface 27 which is located below the support 23 of the screen whereas plants placed at the opposite edge receive the maximum illumination period.

Between these two edges of the growth surface the illumination periods plotted against the sites will form a continuous and regular distribution function whose minimum corresponds to the preadjusted minimum value and whose maximum corresponds to the preadjusted maximum value.

EXAMPLE 3

Figure 5:
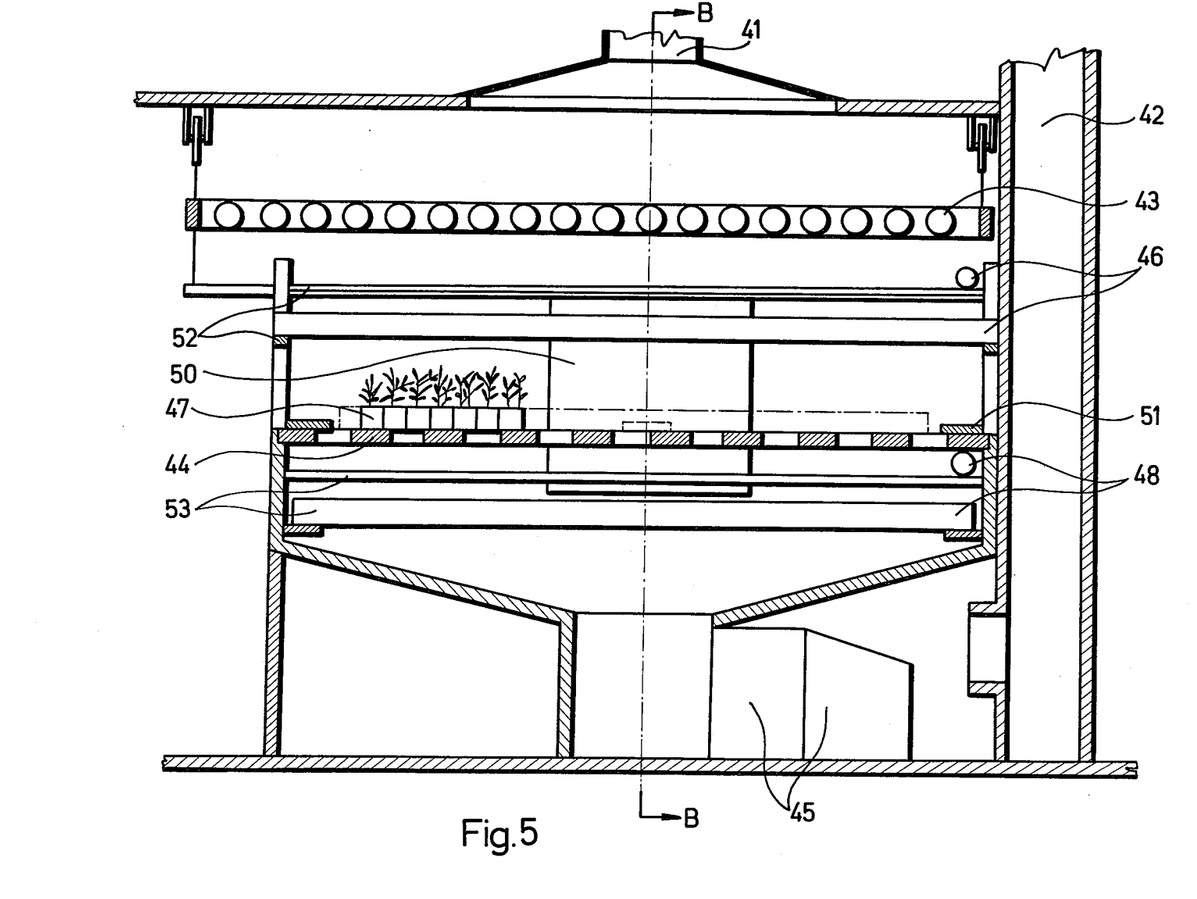
FIG. 5 is a side-view section of an advantageous embodiment of the equipment according to the invention suitable mainly for investigations on the protection of the environment.
Figure 6:
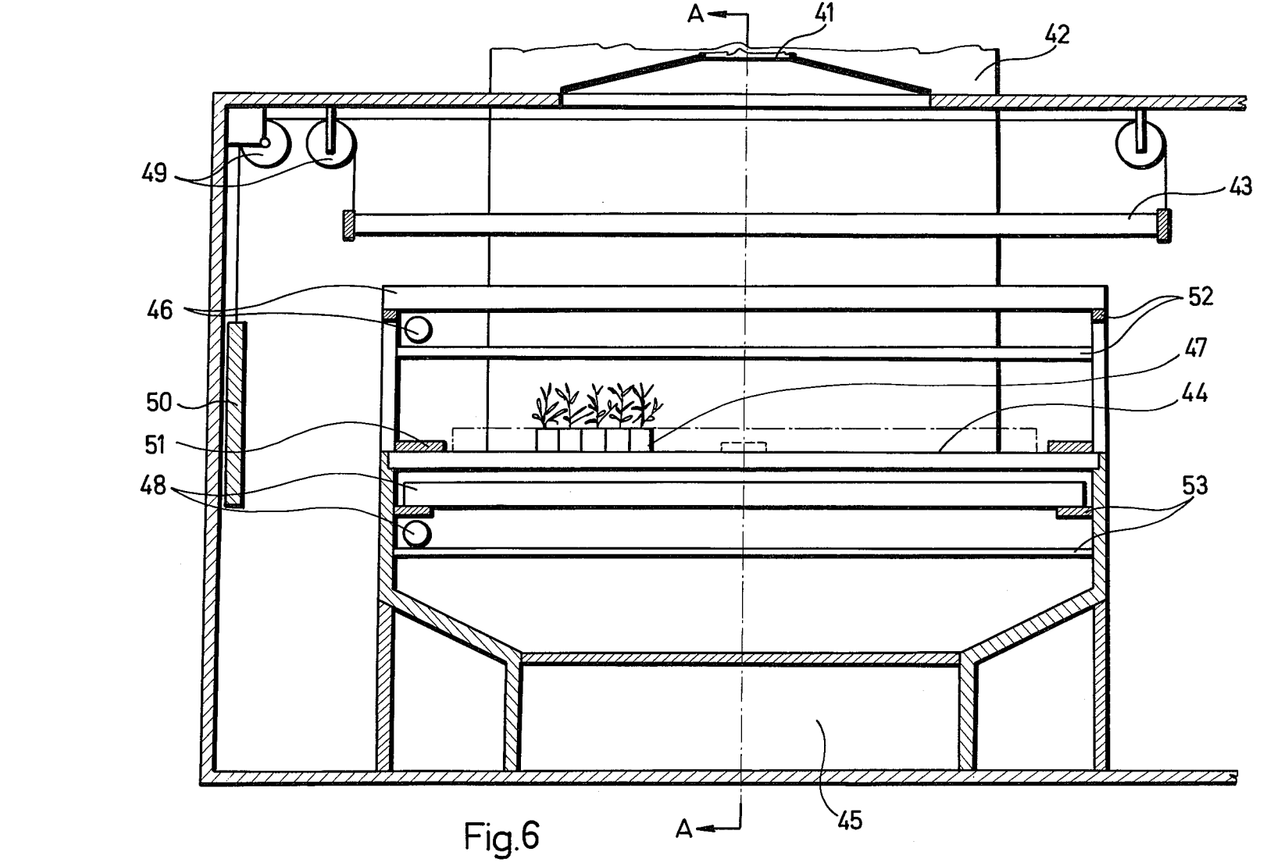
FIG. 6 is a section of FIG. 5 along the line B—B.

In this Example an embodiment (phytotron) of the equipment according to the invention suitable mainly for the optimization of investigations concerning the protection of the environment is specified with reference to FIGS. 5 and 6.

The experimental plants 47 are placed on the growth surface 44 in a determined or at any optional moment determinable arrangement. Values of air temperature can be adjusted in a programming unit not shown in the Figures. Filtered pure fresh air is sucked in through the pipe fitting 42 and passed through the climatizing unit 45 equipped with a fan, and then enters the growth space through the specially designed growth surface 44 equipped with holes. Air of adjusted temperature entering the growth space flows vertically upwards above the growth surface 44 and is then sucked off through aperture 41 and through the pipe system connected with it. Neither the sensors of the regulating system and of any possible recording devices, nor the programming units, nor the compressors and other refrigeration appliances of the cooling system are shown in the Figures.

The value of the light intensity at the growth surface 44 can be adjusted by moving the light canopy 43 in a vertical direction. This movement is facilitated by the counter-balance 50 connected with the frame through the pulleys 49.

The pipes 46 which are movable along the conducting rails 52 at an adjustable acceleration and which have a continuously varying spraying surface serve for the irrigation with water containing diverse contaminants (cadmium, lead, mercury, etc.) and/or for filling up with soils containing diverse contaminants (arsenic, antimony, lead, etc.) and/or for spraying with various plant protecting agents and/or for spraying with various polluting powders (cement, soot, etc.), of determined areas of the growth space.

By means of the pipes 48 which are movable along the conducting rails 53 and/or have a continuously varying spraying surface, the air blown into the growth space through the growth surface 44 can be contaminated with various gases (sulphur dioxode, carbon monoxide, nitrogen dioxide, hydrocarbons, etc.) or with various powders (lead chloride, lead peroxide, etc.).

The growth equipment according to the Example can be operated as follows. In the case of the adjustment specified here, gradients of sulphur dioxide concentration and nitrogen dioxide concentration are adjusted in directions perpendicular to one another.

The plants 47 serving as experimental individua are placed on the growth surface 44 in an arrangement determined by the nature of the experiment. The desired values of air temperature and humidity are adjusted in the programming unit, then the light intensity and the length of day and night are adjusted by moving the light canopy. The concentrations of sulphur dioxide and nitrogen dioxide flowing into the pipes 48, the degree of acceleration of the pipes and the frequency of contamination with these gases are also adjusted. This completes the preparation (adjustment) of the equipment for the experiment; thereafter the adjusted values are automatically maintained or readjusted by the regulating units of the equipment.

Regulation is carried out in such a way that filtered pure fresh air sucked in through pipe 42 is passed through the climatizing unit 45, meanwhile taking up the programmed temperature and humidity. Prior to allowing the air to reach the plants 47 after passing through the growth surface 44, contamination with sulphur dioxide and nitrogen dioxide is added from pipes 48 at an adjusted frequency and in adjusted concentrations. The contaminated air flows vertically between the plants 47, and is then sucked off through pipe 41.

It can be clearly seen in FIGS. 5 and 6 that the minimum concentration of sulphur dioxide will appear at the edge of the growth surface where the pipe blowing in the sulphur dioxide moves at the guickest rate, and the maximum concentration at the point where the pipe moves at the slowest rate. Minimum and maximum values are measured with sensors 51. The minimum and maximum values of nitrogen dioxide are obtained at the other two edges of the growth surface in a manner analogous to that specified above. Between the edges where minimum and maximum gas concentrations occur a continuous and regular distribution of gas concentration will develop.

EXAMPLE 4

In this Example an embodiment of the equipment according to the invention suitable mainly for basic biological research is presented.

As far as maintaining the conditions of treatment is concerned, the construction of the growth space is essentially the same as in the embodiments already presented in Examples 1 to 3, so this part of the equipment is not specified again here. One or more measuring units which are movable in a co-ordinated way by programming or by regulation are placed in the growth space of the equipment. With the help of these units the conditions of treatment or the distributions of the properties of the treated individua can be mapped during the treatment for each individual site.

Depending on the number and nature of the parameters investigated, this measuring unit movable in a co-ordinated way may consist of a remote-controlled television camera, a thermovision camera, sensors for probing soil and air temperature, soil and air humidity or illumination, sampling devices for taking samples from the soil, from the investigated experimental individua or from defined points of the air space, or of combinations of these devices. The individual sensors and sampling devices can first be transferred to a position suitable for measurement and/or investigation in relation to the given arrangement of organisms to be raised, and subsequently forward information relating to the examined experimental material and/or arrangement to data collecting and evaluating systems.

EXAMPLE 5

The embodiment of the equipment according to the invention presented in this Example is characterized, besides the details already presented in Examples 1 to 4, by the possibility of freely governing, with respect to one or more conditions of treatment, the direction of parameter-distributions corresponding to the conditions of treatment, in such a way that in the treating space the relative positions of the treating units which create the distributions in the treating surface and in the treatment conditions are adjusted by rearrangement or switching-over.

In this way the treating units can be utilized for more purposes than in the embodiments presented in Examples 1 to 4.

EXAMPLE 6

Figure 7:
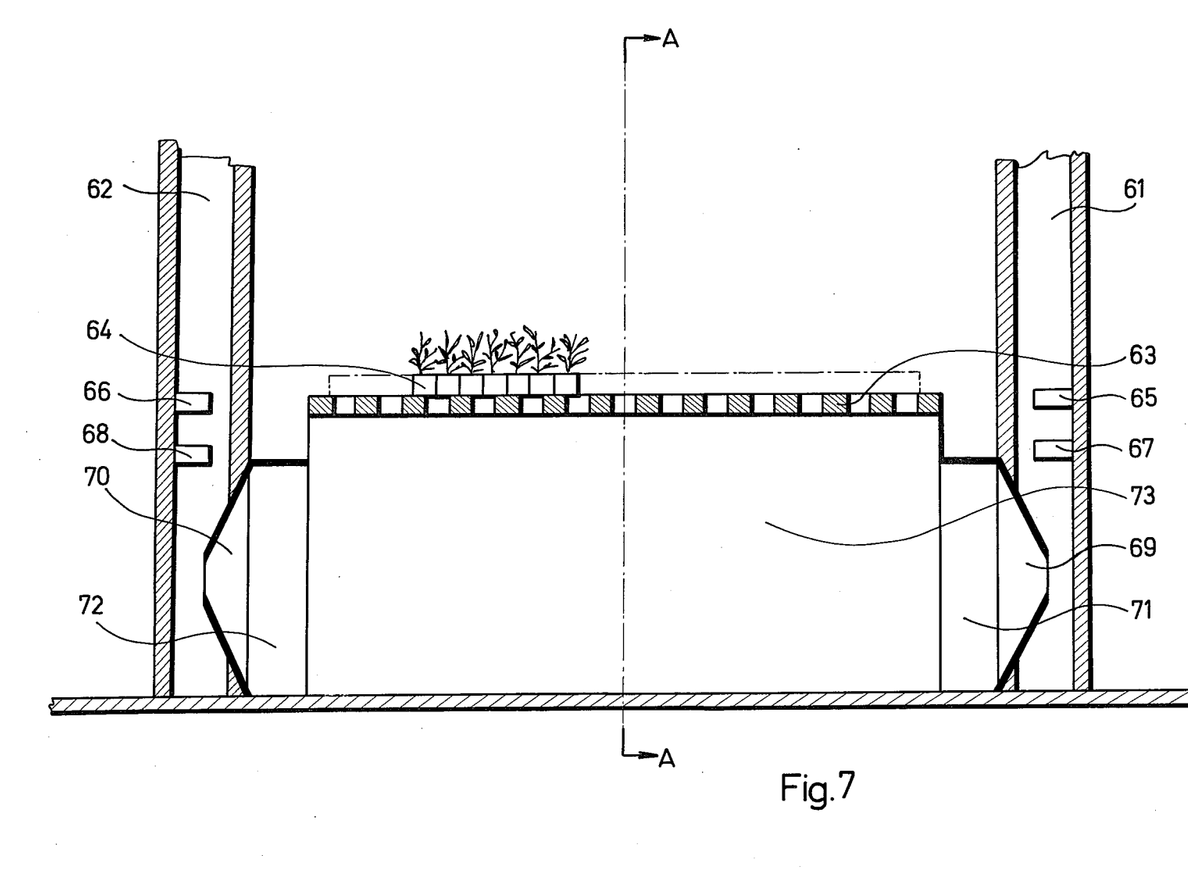
FIG. 7 is a side-view section of the equipment in which distributions of temperature, humidity and gas are created by means of counter-current mixing.
Figure 8:
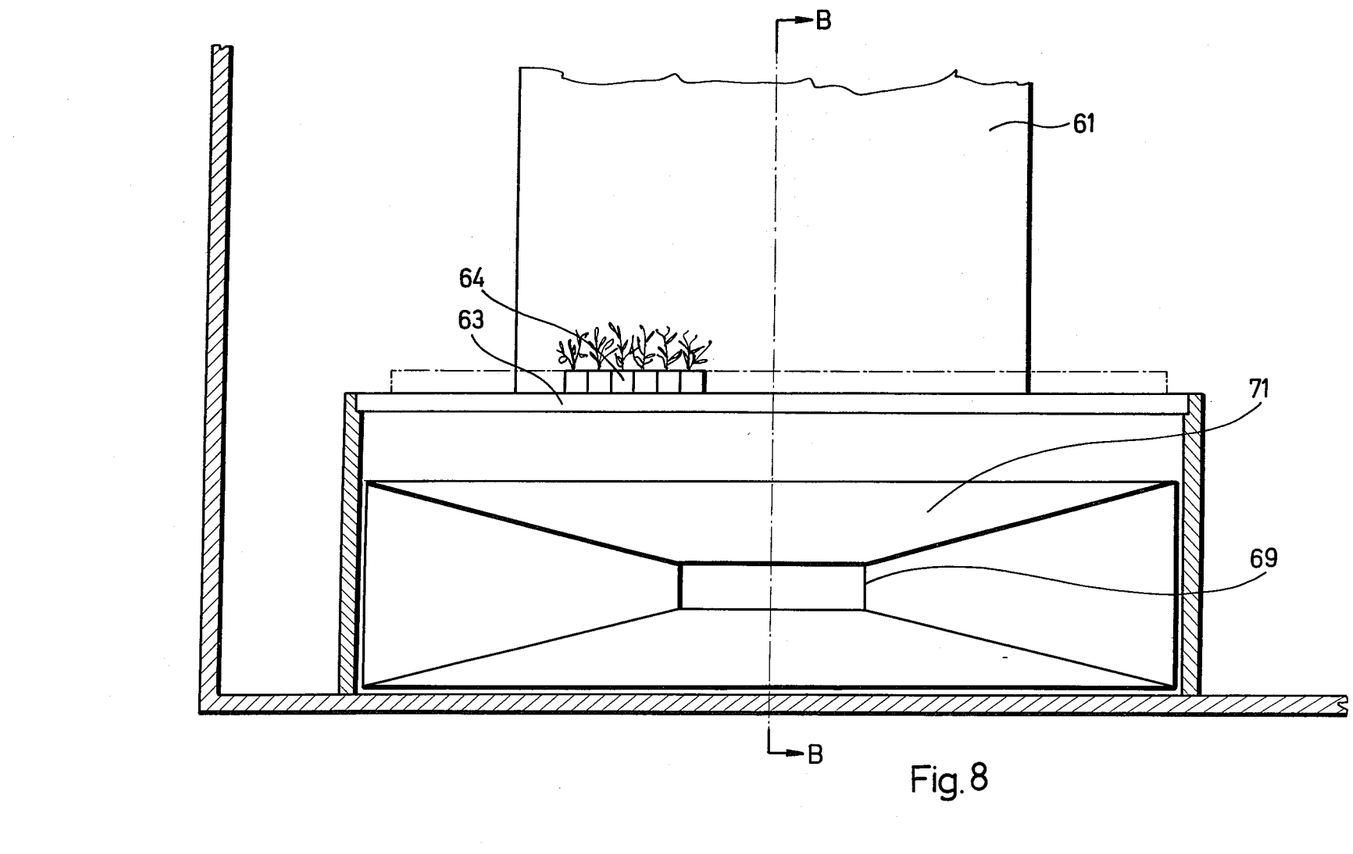
FIG. 8 is a section of FIG. 7 along the line A—A.

In this Example an easily realizable embodiment of the air cooling-heating or humidifying and/or gas feeding units of the equipment according to the invention are presented with reference to FIGS. 7 and 8.

The experimental plants 64 are placed on the specially designed growth surface 63 equipped with holes, in a determined or at any optional moment determinable arrangement. Fresh air is sucked in by fans 69 and 70 through pipes 61 and 62 and is passed through evaporators 71 and 72 to the space 73 below the growth surface where the programmed distribution of temperature, humidity and/or gas takes place due to the effect of counter-current stirring. The moisture and gas required are admixed with the fresh air by gas-feeding devices 67 and 68.

Neither the regulating system and the measuring sensors, nor the programming units, nor the compressors and other refrigeration appliances of the cooling system are shown in the Figures. The construction of the illumination system is essentially the same as in the embodiments already presented in Examples 1 to 5, so it is not described here in detail.

The equipment is operated as follows.

The minimum value of the environmental parameter (temperature or humidity or gas concentration) required for the experiment is adjusted in one of the systems, consisting of pipe 61, fan 69, evaporator 71, humidifier 65 and gas-feeding unit 67, while the maximum value is adjusted in another system consisting of pipe 62, fan 70, evaporator 72, humidifier 66 and gas-feeding unit 68.

It can be clearly seen that at any point above the growth surface 63 the adjusted environmental parameter takes up a value between the minimum and maximum limits, which value will be determined by the distance of this given point from the two systems. The nearer the point in question lies to one of the systems, the greater will be the effect of that system and vice versa. Thus, a regular distribution of the programmed environmental parameter according to the site will be formed between the two systems (i.e., between the minimum and maximum values).

What we claim is:

1. Equipment for the investigation or optimization of the properties and raising methods of organisms, comprising means defining a horizontal support surface for a plurality of said organisms, said support surface extending in two horizontal directions perpendicular to each other, means for subjecting said organisms to a first factor affecting the growth of said organisms, means for progressively regularly varying the degree to which said organisms are subjected to said first factor in a first of said directions, means for subjecting said organisms to a second factor that affects the growth of said organisms, and means for regularly progressively varying the degree to which said organisms are subjected to said second factor in the other of said directions, said organisms being subjected to said first and second varying factors simultaneously.

2. Equipment as claimed in claim 1, one of said factors comprising light.

3. Equipment as claimed in claim 2, said means for varying the degree to which said organisms are subjected to light comprising a lighting fixture, means mounting said lighting fixture for vertical movement relative to said organisms, and means mounting said lighting fixture for vertical swinging movement relative to said organisms whereby the intensity of light received by said organisms from a lower portion of said lighting fixture is greater than the intensity of illumination received by said organisms from an upper portion of said lighting fixture.

4. Equipment as claimed in claim 3, and a frame on which said lighting fixture is mounted for vertical swinging movement, and means for bodily vertically raising and lowering said frame.

5. Equipment as claimed in claim 1, one of said factors comprising temperature, and heat exchange means extending in one of said directions and having progressively varying heat exchange surface area in said one direction.

6. Equipment as claimed in claim 5, said heat exchange means comprising a plurality of tubes through which a heat exchange medium passes, the horizontal spacing between said tubes varying progressively in said one direction.

7. Equipment as claimed in claim 6, said surface being multi-perforate and said tubes being disposed below said surface.

8. Equipment as claimed in claim 1, said factor being moisture.

9. Equipment as claimed in claim 8, said means for varying the degree to which organisms are subjected to said factor comprising at least one perforated pipe through which water is dispensed from above onto said organisms, and means mounting said pipe for horizontal movement perpendicular to the length of said pipe in one of said directions.

10. Equipment as claimed in claim 1, and sensing means for sensing at least one of said factors, said sensing means comprising a plurality of units spaced apart in a horizontal direction in which the corresponding said factor varies.

* * * * *